June 17, 1924.
W. LORENZ
DENTAL APPLIANCE
Filed April 26, 1922
1,498,285
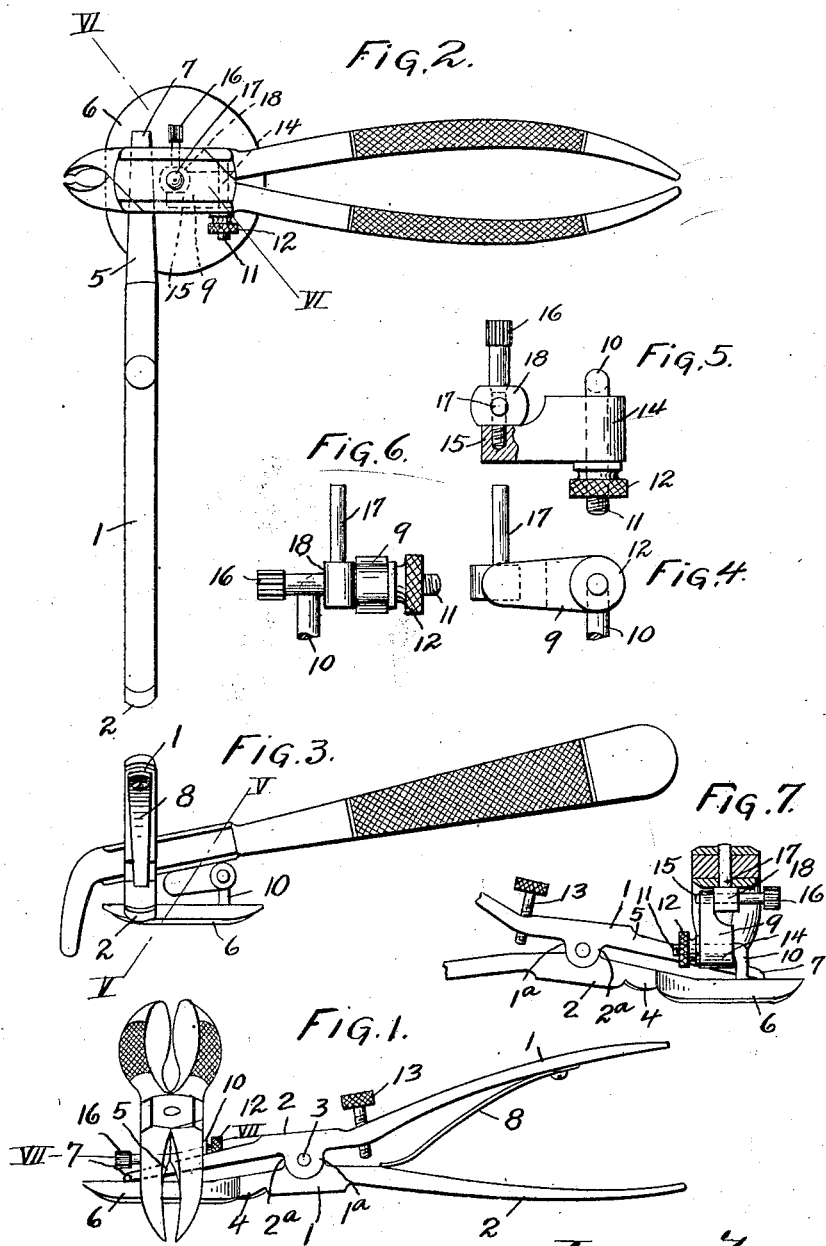
Inventor:
William Lorenz Patented June 17, 1924.

1,498,285

UNITED STATES PATENT OFFICE.

WILLIAM LORENZ, OF NIAGARA FALLS, ONTARIO, CANADA.

DENTAL APPLIANCE.

Application filed April 26, 1922. Serial No. 556,563.

*To all whom it may concern:*

Be it known that I, WILLIAM LORENZ, a British subject, and resident of Niagara Falls, county of Welland, and Province of Ontario, Canada, have invented certain new and useful Improvements in Dental Appliances, of which the following is a specification.

This invention relates to improvements in dental appliances for use in combination with any regular and properly suited dental forcep as now used for extracting teeth, the object of this appliance is to extract a tooth by lifting straight out of the socket in the gum.

The general object being the discovery of an appliance, which, when used in combination with a regular suitable dental forcep lifts a tooth straight out of the socket in the gum.

The object of this invention is to provide a simple and efficient appliance of the class set forth, for extracting teeth, by lifting straight out of the socket in the gum, in either the lower or upper dental arch, with little or no discomfort to the person, whose tooth or teeth are to be taken out.

Another object of the invention is to provide an appliance to be used in combination with any properly suited dental forcep as now in use, the appliance and the forcep being conveniently held and manipulated with both hands, the proper forcep grips the tooth, and through the use in combination of my invented dental appliance, which is easily connected and combined as further on herein described, the tooth is lifted straight out of the socket in the gum.

A further important object of the invention is to provide an appliance of the pliers type, opening contra-scissors fashion, having a flat-nose upraising jaw and a platelike jaw, and various parts so constructed that the appliance when combined with a properly suited dental forcep as now being used, the appliance will cause a tooth to be lifted straight out of the socket in the gum, in either the lower or upper dental arch.

The appliance embodies a pair of pivotally riveted members forming double hinge half through, contra-scissors fashion opening, spring joint pliers, with handle portions, the jaws consist, one of the upraiser which raises the forcep and the other of a platelike jaw, of a suitable size and shape for the mouth, on the bottom of this plate being a covering which is removable, this said covering being of a suitable soft substance or material, the object of this is to lessen the effect of any pressure which might be on the teeth and dental arches, this all being later on herein described.

Various parts make up the construction of this appliance and are all further on described.

This appliance which I have invented for the lifting of teeth straight out of the socket in the gum, is combined with any regular and suitable dental forcep, by the manner later herein described.

Two separate appliances as herein described will be necessary, to be used combined with a suitable dental forcep. One appliance, for the right side of the lower dental arch and left side of the upper dental arch. And one appliance for the left side of the lower dental arch and right side of the upper dental arch. This appliance is also to be provided in several different sizes as later herein described.

The appliance described in the drawings is for the lower right side and upper left side. For the lower left side and upper right side the appliance would be built on the opposite side, but in the same manner otherwise.

In the drawings:

Figure 1, is a plan view and form of the appliance, embodying the invention in combination with a regular dental forcep.

Fig. 2, is a fragmentary view of the appliance, shown in combination with one of the many suitable dental forceps.

Fig. 3, is a fragmentary view of the appliance, shown combined with a dental forcep.

Fig. 4, a detail sectional view on the line V—V, of the Figure 3.

Fig. 5, a detail sectional view on the line VI—VI, of the Figure 2.

Fig. 6, a detail sectional view on the line VII—VII, of the Figure 1; and

Fig. 7, a fragmentary plan view of the form of the means of combining the appliance and a dental forcep.

Referring to the drawings by numerals, 1 and 2 designate the pivoted members of the double hinge half through contra-scissor fashion opening pliers. The members 1 and 2 are pivotally connected through the pivot pin 3 through the adjacent extensions $1^a$ and $2^a$ on the members 1 and 2. The longer arms of the members being slightly bowed to form handles and the shorter arms thereof consisting of the jaws 4 and 5. The jaw 4 consists of the plate 6, later herein described. The jaw 5 consists of the upraising jaw 7, also later herein described. The member 1 is provided with a flat spring 8, the free end of which loosely engages the handle portion of the member 2. This flat spring 8 is mounted on the member 1 (one). This said member 1 is also provided with an adjustable set screw 13. The purpose of this set screw is to regulate or adjust the jaw 5 consisting of the jaw 7 according to the height of the tooth to be taken out.

Rising from the top of this said plate 6 on the jaw 4, is an L-shaped elbowlike arm 10, on the outer end of this said arm 10 is a threaded point 11, on which after the hinge connection mechanism has been attached is put a nut 12, purpose of this said nut 12 being to prevent this hinge connection from slipping or sliding off. This said hinge mechanism is further on described. The outer bottom of the plate 6 is covered with a removable cover of a suitably soft material or substance, which can be changed whenever desired. This covering slipping on and off easily. The purpose of this said covering being to lessen any pressure there might be on the teeth when this appliance is inserted in the mouth.

The hinge connection mechanism herein before mentioned is shown in the Figures 4, 5, and 6, and is shown attached in Fig. 7. This hinge connection mechanism, consists of, a hingelike block 9, said block being shaped as shown in Fig. 5. In this said block 9, are two apertures, one a plain hole aperture 14, through which passes the elbowlike arm 10, and the other aperture 15 is threaded to receive the screw part of the three part screw 16, said screw 16 consisting of, the screw head, the hinge plain smooth part, and the screw end which is threaded into the threaded aperture 15. 17 is a rivet with a head. In the head of this said rivet 17 is a plain hole aperture 18. This said rivet 17 as described is to be manufactured in various sizes and thicknesses, as to fit suitably for its purpose. The purpose of this said rivet 17 being described further on herein.

The dental forceps to be used in combination with this appliance will be fitted with suitable rivets like rivet 17, of the proper size. The purpose of this rivet is to connect the forcep to be used and this appliance. The manner of connecting: First, the top of the old rivet in the forcep, is drilled out about $\frac{1}{16}$ of an inch, so that it (the old rivet) can be easily knocked or driven out. This drilling can be done with a regular dental drill. The new rivet 17 of the suitable size, (in the head of which rivet 17 is the plain hole aperture 18) is put in from the bottom of the forcep, (in which said forcep the old rivet has been removed). The top of the rivet 17 when put in is only loosely clinched so as to allow the rivet 17 to act as pivot to turn or rock about. The forcep is now ready to be combined with the appliance. When this new rivet has once been put in the forcep, it can be connected and disconnected whenever desired. To combine the forcep and appliance, the hinge part of the before mentioned three part screw passes through the aperture 18 in the rivet 17. The screw end part of the three part screw 16 threads into the threaded aperture 15 of the hingelike block 9. This is done in such a manner that the cut out part of the hinge like block 9, touches the aperture 18 in the rivet 17.

Various sizes of this appliance will be provided for the varying sizes of the different mouths, to adapt the appliance to be inserted in the different mouths to take out different classes or types of teeth, through the combining of this appliance with a regular properly suited dental forcep.

The operation is as follows:

The proper forcep, supplied with the rivet 17 (in the head of this said rivet 17 is the plain hole aperture 18) and this appliance are combined in the manner heretofore described. The adjustable set screw 13 is adjusted or regulated according to the height of the tooth to be taken out. The complete appliance is then held in one hand, while the other hand holds the forceps which grips the tooth. The appliance is inserted in the mouth so that the plate 6, rests or presses on either the lower or upper dental arch, according to the location or position of the tooth to be taken out. By contracting the fingers of the hand holding the appliance, to press gently toward each other the handles 1 and 2, the flat spring 8 loosely engages the handle portion of the member 2, the jaw 5 consisting of the upraising jaw 7 as it approaches the jaw 4 will force up the forcep gripping the tooth, this causing the tooth to be drawn straight out of the socket in the gum, through the hinge mechanism, of the hingelike block 9 heretofore described. As the rivet 17 is only loosely clinched it will allow the forcep to slightly and gently loosen the tooth in the socket in the gum as the tooth is being drawn out through the raising of the upraiser 7 of which the jaw 5 consists. The flat spring 8 loosely engages the handle portion of the member 2 and normally holds the pliers in the closed position. In Fig. 7, the appliance and mouth of the forcep are quite clearly shown in connection.

What I claim, and desire to secure by Letters Patent, is:

1. A dental appliance comprising in combination with a pair of forceps, a pair of pliers comprising a pair of jaws, one of said jaws being of platelike shape, and a hinge connection between said plate and pair of forceps.

2. A dental appliance comprising in combination with a pair of dental forceps having a loose pivot rivet, a pair of pliers comprising a pair of jaws, one of said jaws being of platelike shape, and a hinge connection between said plate and rivet.

3. A dental appliance comprising in combination with a pair of forceps, a pair of pliers comprising a pair of jaws, one of said jaws being of platelike shape, a soft covering disposed at the outer surface of said platelike jaw, and a hinge connection between said plate and pair of forceps.

4. A dental appliance comprising in combination with a pair of dental forceps having a loose pivot rivet, a pair of pliers comprising a pair of jaws, one of said jaws being of platelike shape, an elbow secured to said jaw, a block loosely connected to said elbow, and a hinge pin loosely passed through said rivet and secured to said block.

5. A dental appliance comprising in combination with a pair of dental forceps having a loose pivot rivet, a pair of pliers comprising a pair of jaws, one of said jaws being of platelike shape, an elbow secured to said jaw, a block loosely connected to said elbow, a nut threaded on the free end of said elbow, a hinge pin loosely passed through said rivet and screwed into said block.

6. A dental appliance comprising in combination with a pair of dental forceps, a pair of pliers comprising a pair of jaws adapted to open in contra-scissors manner, one of said jaws being of platelike shape, and a hinge connection between said jaw and forceps.

7. A dental appliance comprising in combination with a pair of dental forceps, a pair of pliers including a pair of pivotally connected members terminating in jaws, a spring secured to one of said members and engaging the other member, a set screw passed through one of said members and adapted to limit the extent of opening of said jaws, one of said jaws being of platelike shape, and a hinge connection between said jaw and forceps.

Niagara Falls, April 18th, 1922.

WILLIAM LORENZ.

Signed in the presence of—
  W. J. SEYMOUR,
  ISABEL DRESDEN.